April 7, 1970  H. H. MALVIN  3,504,981
DUAL COLORIMETER SYSTEM FOR SEQUENTIAL ANALYSIS
OF A PLURALITY OF SAMPLES
Filed Aug. 9, 1965

INVENTOR.
HARRY H. MALVIN
BY
ATTORNEYS 3,504,981
DUAL COLORIMETER SYSTEM FOR SEQUENTIAL ANALYSIS OF A PLURALITY OF SAMPLES
Harry H. Malvin, 104 Mendoza St.,
San Antonio, Tex. 78235
Filed Aug. 9, 1965, Ser. No. 478,495
Int. Cl. G01j 3/48, 3/46, 3/34
U.S. Cl. 356—185                2 Claims

ABSTRACT OF THE DISCLOSURE

A pair of colorimeter systems, each comprising a circular cuvette holder a prism system and a photoelectric cell, mounted on 90° axes. A common mechanism rotates the two systems synchronously, and a common light source provides light for both. Beams are directed from the light source to be intercepted individually by the individual cuvettes placed at the periphery of the cuvette holders. The two systems accommodate respectively, a standard beam, a control cell, and a beam of the same intensity beamed successively through specimens under examination.

---

The invention described herein may be manufactured and used by or for the United States Government for governmental purposes without payment to me of any royalty thereon.

The present invention relates to improvements in colorimetric devices, and more particularly, to a device wherein rapid analysis can be made of a comparatively large number of specimens in rapid sequence. The object of the invention is the expediting of procedures of specimen analyses by means of light response of samples to be analyzed and their comparison to a standard specimen.

The invention may be applied to the determination of characteristics of many kinds of materials by an examination of the manner in which light is modified when transmitted through them.

Another application of the invention is its adaptation in the field of space flight for determining the physical condition of men in space.

A still further object of the invention is the effecting of substantial savings in time and complicated equipment by the provision of a simplified and efficient device for obtaining rapidly and sequentially and optical examination of a comparatively large number of sample. Laborious one by one analyses are eliminated and complicated devices become unnecessary.

In the device of the invention two cylindrical systems are arranged in angular relationship, preferably 90°, although this can be modified within the scope of the invention.

Each system carries standard elements and provides the control. Each system is provided with similarly arranged optical filters and iris diaphragms. One system only is provided with a sample holder on which the samples are arranged in circular formation about an axis.

A pair of beams from a single light source are directed at an angle of 90° to each other, and, by means of a rotating system of reflectors, are passed sequentially through the specimens and are then directed to photoelectric cells.

These and other advantages, features and objects of the invention will become more apparent from the following description taken in connection with the illustrative embodiments in the accompanying drawings, wherein.

Figures 1, 2:
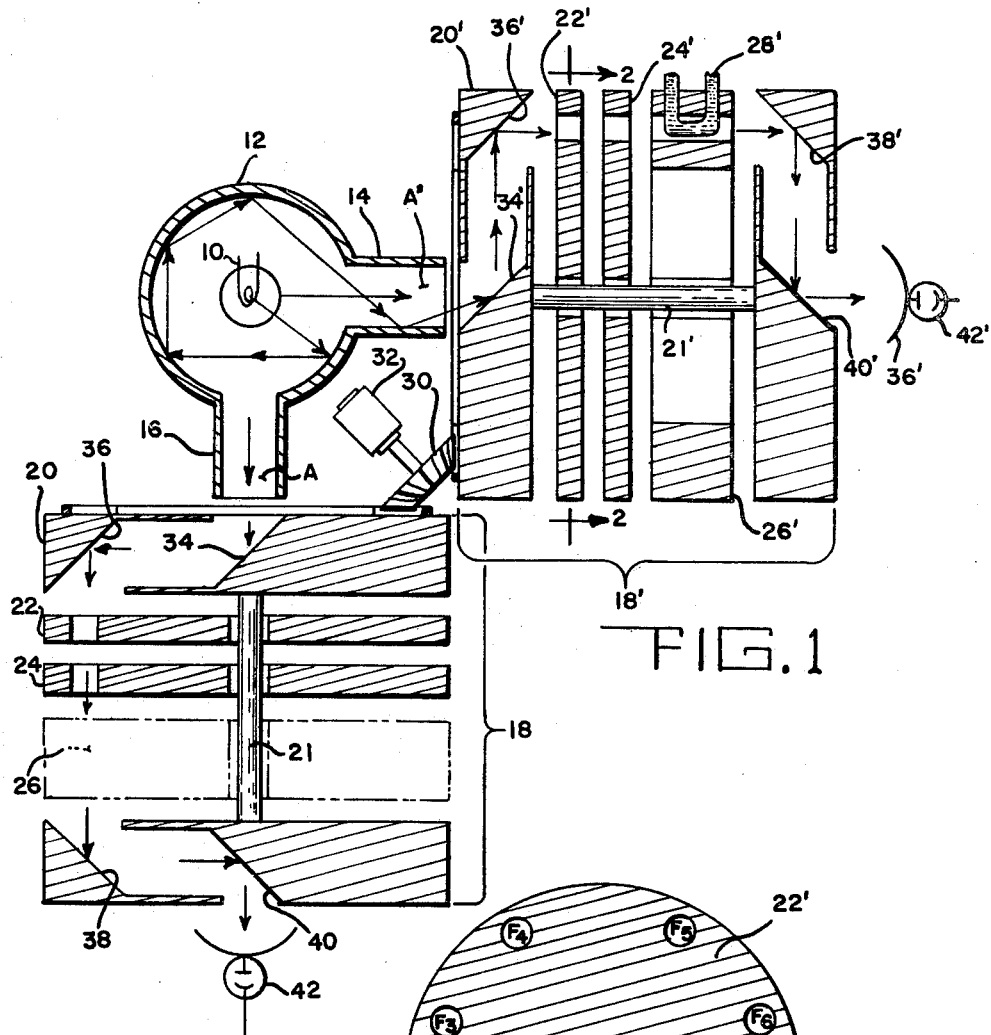
FIGURE 1 is a schematic plan view for comparison of the entire device.
FIGURE 2 is a cross section taken on the line 2—2 of FIGURE 1.

Referring more in detail to FIGURE 1, a light 10 is positioned in a light housing 12; the light housing is provided with openings or slits or channels or light stops 14 and 16, in which the light beam is collimated. As shown, the light stops 14 and 16 are directed away from the light housing 12 in 90° relationship. This angle may be varied. The collimated light directed in two directions from the light source is beamed to the units 18 and 18'. Each unit 18 and 18' comprises a rotating prism system 20 and 20', color filter disks 22 and 22', and iris diaphragm disks 24 and 24'. In addition the unit 18' has a cuvette wheel 26' upon which a series of tubular flow cells or cuvettes 28 are arranged and through which the light is beamed.

For practical purposes the cuvette wheel 26 is stationary and the prism system rotates. Ths relationship, if desired, could be reversed within the scope of the invention and will be practical where the specimens under analysis are other than fluid.

In the example shown, the prism systems 20 and 20' are mounted on axes 21 and 21' and are rotated simultaneously through the bevel gear 30 operated by the motor 32. Each prism system has four prisms or mirrors which intercept the beams A and A'. Each centrally located reflector 34 and 34' is located on the axis of the system and although rotating, continuously picks up the beams from the collimators 14 and 16 directing them to the peripherally located prisms 36 and 36'. Here they are redirected along peripheral paths which are parallel to the axes of the systems and are flashed sequentially through the color filters $F_1$ to $F_8$, inclusive, on the disks 22 and 22', the iris diaphragms, and in the analysis unit, sequentially through the specimen-containing cuvettes 28. If desired, the unit 18 may also contain standard specimens with which the unknown is to be compared. (See the element 26' shown in phantom in FIGURE 1.) The beams A and A' are then intercepted by the peripherally located mirrors or prisms 38 and 38', thence to mirrors or prisms 40 and 40', to photoelectric cells 42 and 42' where the analyses are made by standard devices provided for this purpose and not shown here.

As will be evident, the arrangement of the cuvettes on the cuvette wheel 26' will be the same as that of the filters and iris diaphragms on their respective disks. Each beam therefore follows an unintercepted path through these elements. As shown in FIGURE 2, eight elements $F_1$ to $F_8$ on each disk make the placement at 45°.

The specific mountings and adjusting means of the iris diaphragms and the filters are elective within the scope of the invention. FIGURE 2 shows a filter disk 22' having a slot 25 for slipping over the axis element 21'.

Although 90° is shown as the rotation of the radii along which the beams from the light source are initially divided, this angle can be varied within the scope of the invention. Beams may be directed in opposite directions from the lamp, i.e. the angle may be 180 and the axes of the prism systems may conceivably be in the same straight line.

Although the invention has been described with reference to a particular embodiment, it will be understood to those skilled in the art that the invention is capable of a variety of alternative embodiments within the spirit and scope of the appended claims.

I claim:
1. In a colorimeter for making rapid and sequential optical analyses of unknowns, a light source for projecting first and second light beams from said light source along first and second perpendicular axes intersecting at said light source, first and second filter means for rendering the two beams identical, an unknown sample cuvette wheel, a standard cuvette wheel, said wheels being mounted one along each of said first and second perpendicular axes, said filter means also being mounted one along each of said first and second perpendicular axes, samples of unknowns to be analysed located in circular formation on said sample cuvette wheel and in locations to intercept light beams from said light source, standards for comparison located in circular formation on said standard cuvette wheel, first and second said wheels, a pair of prism systems, reflectors on said first prism system for reflecting light from said light source sequentially to and through the cuvettes located on said sample cuvette wheel, reflectors on said second prism system for reflecting light from said light source sequentially to and through the standards located on said standard cuvette wheel, first and second photosensitive systems located to measure light transmitted through an unknown sample and light transmitted through a standard and common motor means for providing relative rotary motion to said prism systems so that said first and second light beams pass sequentially through corresponding respective unknown samples and standards.

2. A colorimeter as claimed in claim 1 wherein each of said prism systems comprises a first reflector located on each one of said axes to receive a beam of light from said light source at a 45° angle and to redirect said beam 90°, a second reflector located adjacent the circumference of said cuvette wheel to receive said redirected beam at an angle of 45° and again redirect it 90° to be received by and pass through a color filter and thence beamed sequentially through the unknown samples on said sample cuvette wheel on said first axis and through standard mounted on said standard cuvette wheel on said second axis, a third reflector located to receive the beam emanating from each of said sample cuvette on said first axis and each of said standards on said second axis at an angle of 45°, and to redirect said beam 90°, a fourth reflector for receiving said beam at an angle of 45° and again redirecting it 90° to be received and analysed by said first and second photosensitive systems.

References Cited

UNITED STATES PATENTS

| | | | |
|---|---|---|---|
| 2,802,391 | 8/1957 | Maier | 356—185 |
| 2,253,581 | 8/1941 | Reynolds | 250—218 |
| 2,265,182 | 12/1941 | Mestre | 350—90 |
| 2,483,875 | 10/1949 | Boyer | 250—218 X |
| 3,016,787 | 1/1962 | Brehm. | |
| 3,031,917 | 5/1962 | Pelavin | 250—211 X |
| 3,236,148 | 2/1966 | Pelavin. | |
| 3,241,432 | 3/1966 | Skeggs et al. | |
| 3,340,764 | 9/1967 | Bergson. | |
| 2,118,837 | 5/1938 | Felton. | |

FOREIGN PATENTS 502,971  3/1939  Great Britain.

OTHER REFERENCES

IBM Tech. Disc. Bull., v. 4, No. 1, June 1961, p. 68.

RONALD L. WIBERT, Primary Examiner

W. A. SKLAR, Assistant Examiner

U.S. Cl. X.R.

356—188, 195; 250—226